United States Patent [19]
Robbins et al.

[11] Patent Number: 5,641,096
[45] Date of Patent: Jun. 24, 1997

[54] CONDIMENT DISPENSER

[75] Inventors: E. Stanley Robbins, Killen; Frans M. Weterrings, Tuscumbia; Rodney W. Robbins, Florence, all of Ala.; Horst Ludwig Arnold Honsa, Savannah, Tenn.

[73] Assignee: Robbins Industries, Inc., Florence, Ala.

[21] Appl. No.: 405,522

[22] Filed: Mar. 16, 1995

Related U.S. Application Data

[63] Continuation-in-part of Ser. No. 178,889, Jan. 7, 1994, Pat. No. 5,490,615.

[51] Int. Cl.⁶ .................................................. G01F 11/18
[52] U.S. Cl. ........................ 222/284; 222/287; 222/365
[58] Field of Search ................................ 222/284, 287, 222/365, 510, 518, 559

[56] References Cited

U.S. PATENT DOCUMENTS

| | | | |
|---|---|---|---|
| 1,171,575 | 2/1916 | Zsidakovitz | 222/365 X |
| 1,772,041 | 8/1930 | Harris . | |
| 2,122,216 | 6/1938 | Seawell | 222/365 X |
| 2,198,499 | 4/1940 | Jennings | 222/365 X |
| 2,607,355 | 8/1952 | Neal et al. | 222/510 X |
| 2,847,147 | 8/1958 | Land | 222/365 X |
| 3,040,937 | 6/1962 | Lantery . | |
| 4,875,600 | 10/1989 | D'Hoogue et al. | 222/454 X |
| 5,138,979 | 8/1992 | Baird et al. | 222/365 X |
| 5,259,537 | 11/1993 | Beers et al. | 222/365 X |

FOREIGN PATENT DOCUMENTS

| | | | |
|---|---|---|---|
| 681646 | 3/1964 | Canada . | |
| 2415796 | 9/1979 | France | 222/365 |
| 450298 | 7/1949 | Italy | 222/365 |

*Primary Examiner*—Kevin P. Shaver
*Attorney, Agent, or Firm*—Curtis, Morris & Safford, P.C.; Gregor N. Neff, Esq.

[57] ABSTRACT

The dispenser has a plunger which is pressed downwardly by the user to dispense condiments, such as salt, pepper, sugar, spices, etc. The plunger structure has a dispensing head which passes through an outlet opening in the base of the device. The outlet opening through which the dispensing head passes is sealed by use of a seal structure forming a flexible flap contacting the head. The seal is secured in a base which can be removed to provide a wide opening for refilling the container. The device dispenses a predetermined quantity of condiment with each stroke reliably and with a minimum danger of jamming.

12 Claims, 8 Drawing Sheets

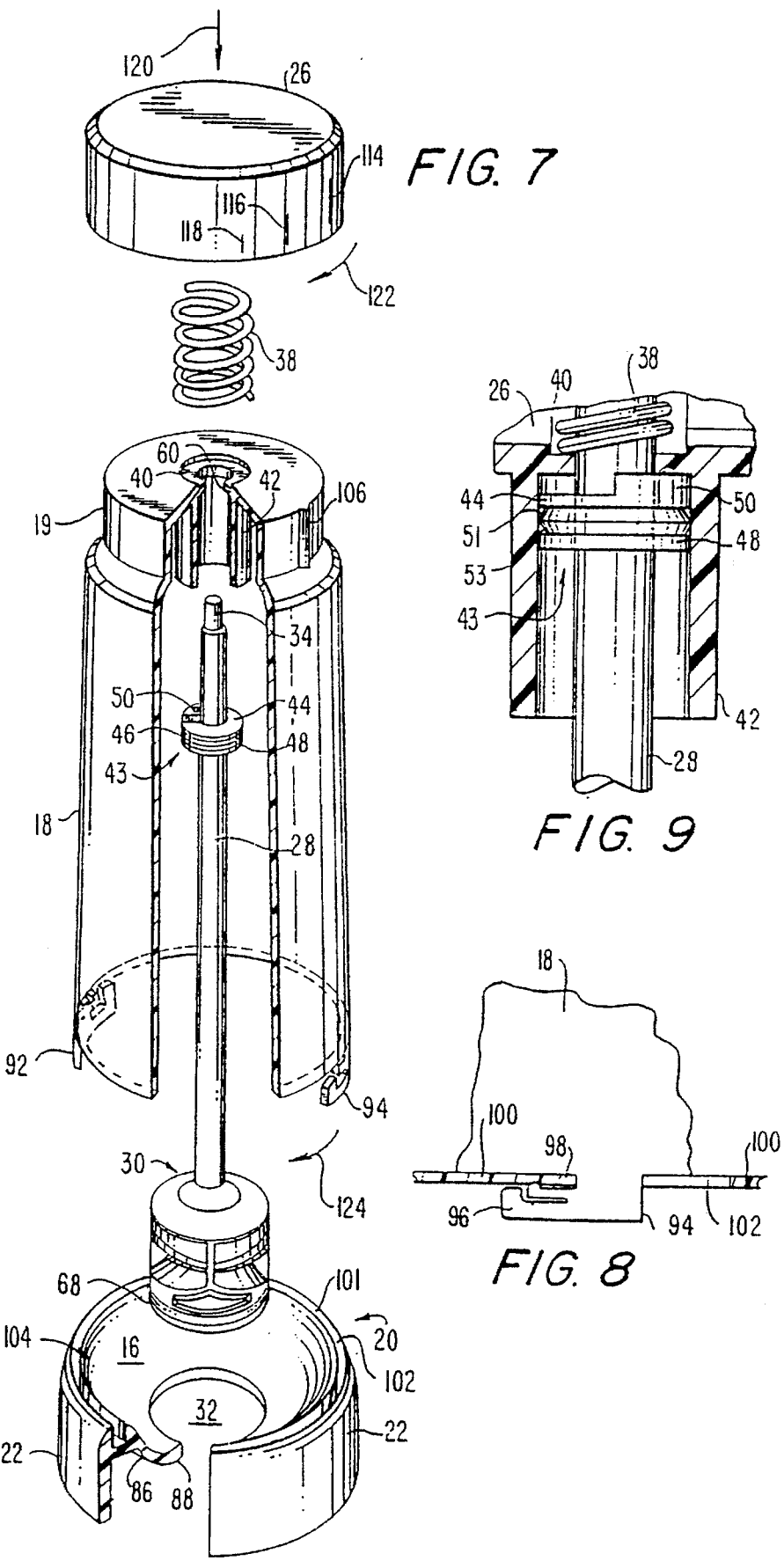

CONDIMENT DISPENSER

This invention relates to dispensers, and particularly to dispensers for dispensing salt, pepper, spices and other condiments. This application is a continuation-in-part of U.S. patent application Ser. No. 08/178,889, filed Jan. 7, 1994, now U.S. Pat. No. 5,490,615, granted Feb. 13, 1996.

Plunger-type condiment dispensers have been proposed in the past. Most such dispensers have had relatively little acceptance because of several problems.

One problem with such prior dispensers is that the plunger which passes through an outlet opening in the bottom of the condiment container often jams because the condiment interferes with the movement of the parts.

Another problem is that humid air often enters the container and causes the condiment, such as salt, sugar, etc., to cake and accumulate at the junctions between the moving parts of the device and contribute to jamming. The caked condiment is a nuisance to remove or break up.

Additional problems with such prior devices include the inability to accurately control the amount of condiment dispensed.

The accurate measurement of condiments used in cooking has become increasingly important because of the need to restrict the intake of certain substances in modern diets, such as in salt-restricted diets.

It is an object of the invention to provide a condiment dispenser which solves or alleviates the foregoing problems.

In particular, it is an object to provide such a dispenser which dispenses the condiment in accurately pre-measured amounts.

It is a further object to provide such a device in which variable amounts to be dispensed can be preselected and dispensed quickly and easily.

Another object of the invention is to provide a dispenser, particularly one of the plunger type, which operates relatively free of jamming.

It is a further object of the invention to provide such a dispenser which protects the contents against excess contact with the outside air, and thus minimizes caking and other deleterious effects due to such contact.

It is another object of the invention to provide such a device which is relatively simple in construction, easy to disassemble for filling and cleaning, and easy to use.

It is a further object of the invention to provide such a device which is of relatively inexpensive construction, but which is sturdy and reliable for use over a relatively long period of time.

In accordance with the present invention, the foregoing objects are met by the provision of a condiment dispenser which will dispense one of a plurality of pre-determined quantities of condiment with a single stroke or cycle of operation.

Preferably, the dispenser has a condiment container with an outlet opening, and a dispensing member mounted in the container for moving in a reciprocating motion through the outlet opening to dispense a condiment. The dispensing member includes means for metering the quantity of condiment dispensed as a function of the distance the dispensing member moves through the outlet opening. Additionally, means are provided for selecting one of a plurality of predetermined distances for the dispensing member to move through said opening so as to dispense a preselected quantity of condiment with each actuation of the dispensing member.

The dispensing member or head preferably has a plurality of recesses spaced apart from one another in the direction of motion of the dispensing head so that the contents of different ones of the recesses are dispensed through the outlet opening depending upon the distance moved by the dispensing head.

It also is preferred that the walls separating the recesses from one another form an acute angle with the plane of the outlet opening so as to provide a shearing motion to minimize the chances of jamming.

Preferably, an actuating member or plunger extends out of the container for manual movement of the dispensing member. A sliding seal or elastic sealing member or "O"-ring is provided to hermetically seal the condiment container against the atmosphere at the location where the actuating plunger extends out of the container. This seal also minimizes the escape of condiments from the container.

The dispensing head preferably has another elastic sealing member or "O"-ring which normally is seated against the bottom edge of the outlet opening to seal it hermetically. Preferably, the end of the dispensing head at which the sealing ring is located is of a diameter so that it can pass through the opening, while the sealing ring is compressed, so as to facilitate removal of the bottom of the container for refilling and cleaning, etc.

In a preferred embodiment of the invention, the sealing member for the dispensing head is made of flexible material forming a flap which contacts an enlarged portion of the dispensing head when the dispensing head is fully retracted into the dispensing container. The flexible flap provides smoother movement of the dispensing head through the outlet opening.

Preferably, the container includes a side wall and a base which is easily detachable from the side wall for filling the container and cleaning its inside surfaces. The side wall preferably has projecting clips fitted through slots in the base to quickly and easily attach and remove the base member by twisting the base and the side walls relative to one another. Screw threads thus are avoided, along with the problem of jamming often found when screw threads are used in such a device.

In a preferred form of the invention, the quantity to be dispensed with each stroke of the actuating member or stem is determined by one of a plurality of stops which can be selected by rotating the cap of the device. Preferably, the stops consist of a plurality of grooves of varying lengths, and at least one projection which serves as a stop member and operates to stop the downward motion of the stem when it reaches the end of the groove in which it travels. A detent mechanism is provided to insure that the stop member is aligned properly with one of the grooves.

In accordance with another feature of the invention, the actuating member can be locked with all of the openings of the container shut. This prevents unwanted dispensing of condiments. Also, one or both of the openings to the container is sealed tightly shut by a cam mechanism which forces one or both sealing members against its seal, while locking the stem against movement.

Thus, the stem can be locked and the upper seal closed tightly while the base of the dispenser is removed to allow the interior of the container to be washed with water without the water leaking through the seal into the area under the cap.

The upper seal also can be held tightly shut in this manner to facilitate filling the container without allowing condiment to escape into the area under the cap.

Preferably, the stop mechanism is made to serve a double or triple function. Not only does it serve the function of controlling the quantity of condiment dispensed, but it also performs the detent function, and the locking function described above.

The resulting condiment dispenser meets the objectives set forth above and provides a relatively simple, jam-free measuring dispenser which can be used to accurately measure and dispense pre-determined quantities of condiments, thus improving the diets of the users, as well as serving the convenience of cooks and diners alike.

The dispenser is a sturdy device with a high degree of resistance to the adverse effects of humidity.

This dispenser also is relatively inexpensive to make, easy to take apart for cleaning, and relatively free of leakage when being filled or transported.

The foregoing and other objects and advantages will be set forth in or apparent from the following description and drawings.

In the drawings:

FIG. 7 is an exploded perspective view of the dispenser shown in FIG. 1;

FIG. 8 is an elevation view, partially broken-away, of a portion of the device shown in FIG. 7;

FIG. 9 is a cross-sectional enlarged view of a portion of the device shown in FIG. 1;

GENERAL DESCRIPTION

Figure 1:
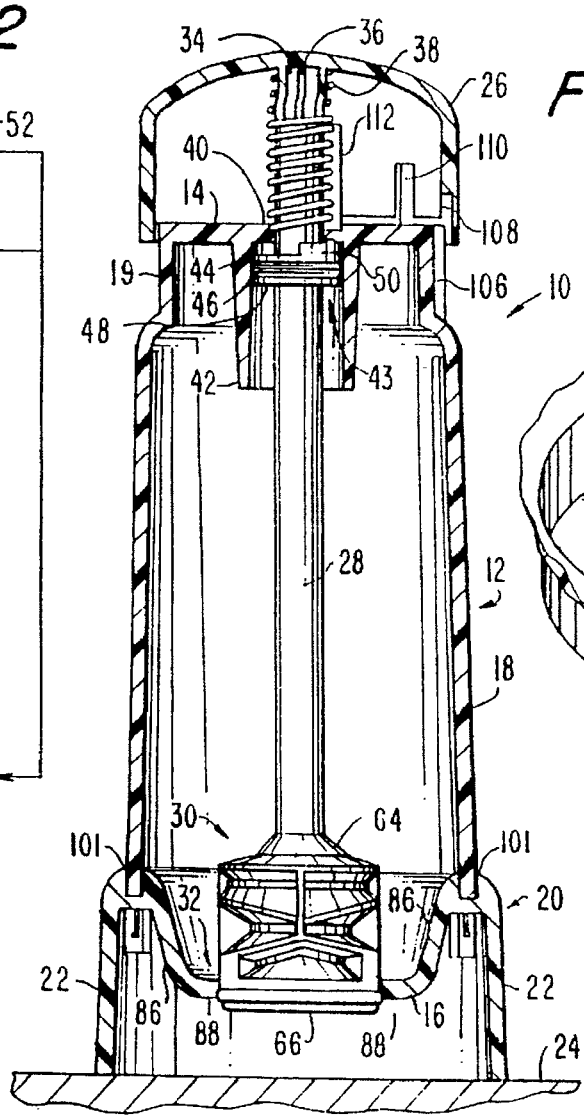
FIG. 1 is a cross-sectional view of a condiment dispenser constructed in accordance with the present invention.

FIG. 1 is a cross-sectional view of a dispenser device 10 constructed in accordance with the present invention. The device 10 includes a container 12 for containing the condiment to be dispensed. The container 12 includes a round, slightly frustro-conical side wall 18, a top wall 14, and a bottom wall 16.

The bottom wall 16 is the concave top wall of a base 20 which supports the bottom wall 16 above a flat surface 24 on which the dispenser 10 is designed to sit. The base is easily removable from the side wall 18 for refilling or cleaning the dispenser. The base 20 has a vertical side wall 22, and joins with the concave top wall 16 which has an upper steeply sloping portion 86 and a horizontal portion 88 adjacent an outlet opening 32. The outlet opening 32 is shown more clearly in FIG. 7.

Mounted in the housing 12 is a plunger structure including a stem 28, with a dispensing head 30 attached at one end. At the upper end 34 of the stem 28 is secured a cap 26.

A coil spring 38 encircles the joint between the cap 26 and the end 34 of the stem 38, and extends into a slight recess 40 in the top wall 14 which provides a seat for the spring. This spring urges the stem 28 upwardly and returns it to a rest position after it has been released by the user.

The dispensing head 30 has a plurality of vertically-spaced recesses. When the cap 26 is depressed, condiment is dispensed through the outlet 32.

As it is shown in FIGS. 1 and 7, a variable stop structure is provided in the cap 26 to limit the depth to which the stem and dispensing head are depressed. Three different stops are provided, each being located circumferentially from the other, to provide for dispensing three different pre-determined quantities. The quantity to be dispensed can be selected by turning the cap 26 to one of three different positions and thus enable one of the three stops.

Sealing structures are provided at 43 and 68 to seal the container against the entry of humid air at all times except when the dispensing head is depressed to dispense condiments, or when the base is removed for refilling or cleaning. Thus, the adverse effects of humidity are minimized.

The seals and the construction of the dispensing head 30 also minimize jamming of the dispensing head.

DISPENSING HEAD

The dispensing head 30 is attached to the stem 28 by a tapered section 64 whose shape prevents the accumulation of condiments on the top of the dispenser head.

Figures 4, 5, 6:
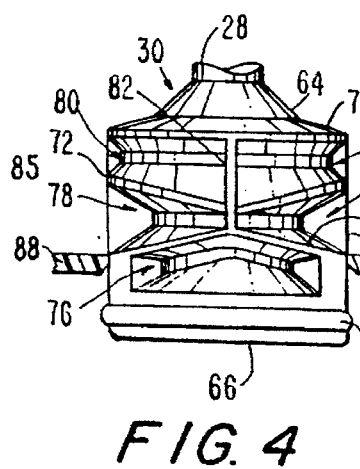
FIGS. 4, 5 and 6 are elevation views of a portion of the device shown in FIG. 1 in three different orientations.

As it is shown in FIG. 1 and in FIGS. 4 through 6, the dispensing head 30 has a bottom end 66 with a neoprene rubber "O"-ring 68 fitted into a circumfrential groove near the bottom end 66. The lower edge of the outlet opening 32 is beveled as shown at 90 in FIG. 5. When the dispensing head is in its rest position, the "O"-ring 68 is thrust upwardly against the beveled edge 90.

The dispensing head 30 has a plurality of vertically-spaced recesses 76, 78 and 80 which are separated and defined from one another by walls 70, 72 and 74.

The lower recesses 76 are relatively small and shallow. There are only two of them. One is shown in FIGS. 1, 4, 5 and 6, and there is another, not shown, which is located 180° from the recess 76.

There are four of the intermediate recesses 78. Also, there are four of the upper recesses 80. Only two of the recesses 80 and 78 are shown in FIGS. 4–6. Two additional recesses 78 and 80 are located 180° from the ones shown. The location of the recesses not shown is symmetrical with the recesses which are shown.

The recesses 78 and 80 are separated from one another circumfrentially by vertical walls 82, 84 and 85. These vertical walls also help to guide the passage of the dispensing head 30 through the outlet opening 32 smoothly.

In accordance with one highly advantageous feature of the invention, the walls 72 and 70 which separate the recesses vertically from one another form an acute angle of at least 30° with the plane of the outlet opening 32. The advantage of this is that, as the walls pass through the outlet opening 32, the maximum total area of contact between the walls and the edge of the outlet opening at one time is considerable smaller than it would be if the walls were horizontal. This reduces jamming.

Furthermore, the walls 72 and 70 move past the edge of the outlet opening with a shearing action which tends to break up any particles of condiment which might temporarily be caught between the walls and the edge of the opening, thus further reducing jamming.

The dispensing head 30 is cylindrical and is dimensioned so that it makes a relatively close fit with the edges of the outlet opening 32. However, it can pass through the outlet opening completely in both directions.

The bottom wall of each of the recesses also is sloped downwardly so as to discharge the condiments from the recesses readily.

TOP SEAL STRUCTURE

Figure 2:
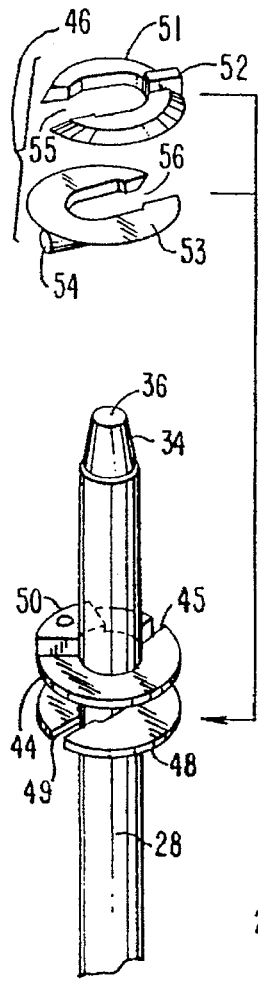
FIG. 2 is an exploded perspective view of a portion of the device shown in FIG. 1.

As it is shown in both FIGS. 1 and 2, the upper end 34 of the stem 28 is frustro-conical and fits into a similarly shaped recess in the center of the underside surface of the cap 26. The stem 34 is cemented in place, and a spline or key on the inside of the receptacle in the cap fits into a keyway 36 to secure the cap to the end of the stem 28.

A substantially cylindrical sleeve 42 extends downwardly from the top wall 14 by a certain distance. The sealing structure 43 slides on the inner walls of the cylinder 42 to seal the interior of the condiment container from the outside air.

Referring both to FIGS. 1 and 2, the sealing structure includes two flanges 44 and 48 which are molded integrally with the stem 28 so that they are securely attached to the stem. Each flange has a gap 45 or 49. The gap 45 is located 180° from the gap 49. A detent and stop member 50 extends upwardly from the flange 44.

The sealing structure 43 includes a resilient seal assembly 46 (see FIG. 2) which consists of two generally C-shaped rings or washers 51 and 53 made of relatively soft and flexible plastic material. Each ring 51 and 53 has an opening 55 or 56, and a projection 52 or 54. Each ring has a beveled outer edge so that when the two rings are assembled face to face, they form a sealing member which has relatively sharp edges, as it is shown in FIG. 9 of the drawings.

The sealing structure is assembled by inserting the washers 51 and 53 into the space between the flanges 44 and 48. The projection 54 of the washer 53 fits into the recess 49, and the projection 52 of the washer 51 fits into the recess 45, thus locking the washers into position so that they will not rotate relative to one another. The gaps 55 and 56 are located 180° from one another. This construction allows assembly of the sealing structure and provides a circumfrentially continuous seal, despite the gaps 55 and 56.

It should be observed that detent projection 50 also serves as a stop to limit the upward movement of the stem 28 when the cap 26 is released. Thus, the sealing ring 68 is thrust against the bottom edge of the outlet opening 32 with only relatively light force; the major portion of the force exerted by the spring is opposed by the detent structure.

The provision of the flexible seal structure 46 is highly desirable because it serves to wipe away grains of condiment which might stick in the cylinder 42. In fact, the cylinder 42 is not exactly cylindrical; the internal diameter at the bottom is slightly greater than the internal diameter at the top, in order to facilitate molding. The flexibility of the structure 46 ensures that sealing contact is made continuously, despite the variation of diameter of cylinder 42, as the plunger moves upwardly and downwardly.

QUANTITY SELECTION

As it has been mentioned above, the quantity of condiment to be dispensed with a given stroke of the plunger in the dispenser 10 can be pre-set. In particular, it is preferred that the device can be set to dispense one of at least three different pre-set amounts.

For example, when the device is used to dispense salt, it has three settings which will dispense either a "pinch", or ⅛ teaspoon, or ¼ teaspoon of salt. A "pinch" is about one forty-eighth of a teaspoon—approximately 0.104 milliliters and 142 milligrams in weight. One eighth of a teaspoon is approximately 0.625 milliliters and 850 milligrams. One quarter of a teaspoon is approximately 1.25 milliliters and 1700 milligrams. Some or all of this information can be printed or embossed on the outside of the cap 26 or elsewhere on the dispenser to enable the user to easily select the right amount to dispense. Similarly, the weights and quantities of other condiments can be preset and marked on the dispenser. Of course, larger quantities can be dispensed by pressing the cap several times.

The manner in which the quantity selection is made is as follows. Referring to FIG. 7, the cap 26 has three vertical markings or indicia 114, 116, 118 on its outer rim. Located on the recessed top portion 19 of the side wall 18 of the container is a vertical projection 106 which serves as a stop member. The stop member 106 can be seen by the user of the dispenser.

Referring now to FIG. 1, the inside of the cap 26 has three vertical grooves 108, 110 and 112 cut into the side wall. The groove 108 is the shortest, the groove 110 is of medium length, and the groove 112 is the longest of the three.

Referring again to FIG. 7, the cap 26 can be rotated in the direction of the arrow 122, and in the opposite direction, to bring one of the three markings or indicia 114, 116 and 118 into alignment with the stop 106.

Referring again to FIG. 1, when the cap 26 is depressed downwardly, the top edge of the stop member 106 abuts against the top end of one of the three grooves 108, 110 and 112 to stop the downward motion of the cap at a preselected location.

Referring again to FIGS. 4, 5 and 6, the depth of each of the grooves 108, 110, 112 is set so that depression of the cap will cause the dispensing head to descend to one of the three positions shown in FIGS. 4 through 6 relative to the edge of the outlet opening 32.

Referring now to FIG. 4, when the shortest groove 108 is aligned with the stop 106, the dispensing head 30 descends no farther than to the position shown in FIG. 4. In this position, the recesses 76 are below the outlet opening 32 so that their contents are discharged. However, the top of the bottom wall 88 is aligned approximately with the lowest point of the recesses 78 so that the contents of recesses 78 and 80 are not discharged.

When the groove 110 is aligned with the stop 106 and the cap 26 is depressed, the dispensing head 30 is allowed to descend further, to the position shown in FIG. 5. At this position, the upper surface of the bottom 88 of the container is just below the lowest point of the recesses 80. However, the lower portions of the recesses 78 are beneath the bottom wall so that their contents are discharged, as well as the contents of the recesses 76. Thus, the total quantity dispensed is the sum of the quantities contained in the recesses 76 and 78.

Finally, when the groove 112 is aligned with the stop 106 and the cap is depressed, the dispensing head is allowed to descend to the position shown in FIG. 6, in which the top of the bottom wall 88 is aligned approximately with the top wall of the recesses 80. Thus, the contents of all of the recesses in the dispensing head are allowed to fall out of the container and be dispensed. This position corresponds to the largest quantity being dispensed (¼ teaspoon of salt, in the specific example described above).

Figure 3:
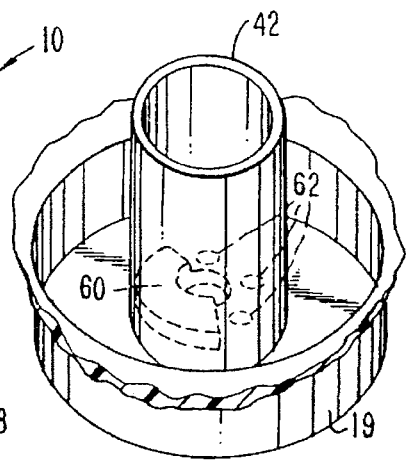
FIG. 3 is a perspective, partially broken-away view of a portion of the device shown in FIG. 1.

To assist the user to accurately align one of the grooves 110, 112, 108 with the stop 106, a detent structure is provided as shown in FIGS. 2 and 3. FIG. 3 is a broken-away view of the top portion of the container 12 with the container turned upside down. On the underside of the top 14 is a stop element 60 and three cavities 62 to mate with a hemispherical projection on the detent member 50. When the detent member 50 is aligned correctly, the detent projection will be inserted into one of the holes 62 so that the user will feel a "snap" or "click" to know that the cap is properly aligned. The stop 60 is provided to engage with the element 50 on the flange 44 so as to prevent the cap from being rotated beyond one of the three dispensing positions.

REMOVABLE BASE

Another advantageous feature of the invention is that the base 20 of the dispenser structure is easily removable from the dispenser to allow it to be refilled, cleaned, etc.

Referring particularly to FIGS. 7 and 8, the upper edge of the base 20 has a circumfrential groove 101 into which the bottom edge of the side wall 18 of the container is inserted.

Extending downwardly from that bottom edge is a pair of clips 92 and 94. FIG. 8 shows the clip 94 in detail. It consists of a vertical, downwardly-projecting portion with a horizontal finger 96 and a second smaller finger 98 which is resilient.

At the base of the groove 101, in the base 20, are two circumfrential slots 102 and 104. In order to attach the base 20 to the dispenser structure, the clips 92 and 94 are inserted through the slots 104 and 102, respectively, and the structure above the base is rotated in the direction indicated by the arrow 124 in FIG. 7 to engage the bottom wall 100 of the groove with the clip as shown in FIG. 8. This creates a secure fastening because the resilient finger 98 brings pressure against the wall 100 to hold the two parts together.

Advantageously, the rubber "O"-ring 68 at the bottom of the dispensing head 30 is sufficiently flexible so that when the base 20 is inserted over the end of the dispensing head 30, the "O"-ring deforms elastically and snaps back into its original shape as the dispensing head passes through the outlet opening.

The upper portion 86 of the recessed top wall of the base 20 is relatively steep. However, the portion 88 adjacent the outlet opening preferably is substantially horizontal. This has been found to minimize the amount of accumulation of granular material at the junction between the dispensing head and the edge of the outlet opening and helps reduce jamming.

The attachment means shown in FIGS. 7 and 8 is highly advantageous in that it does not involve the use of screw threads which usually can become jammed due to grains of condiment being caught in them. The relatively large clips 92 and 94 do not easily suffer such a fate.

ALTERNATIVE EMBODIMENT

FIGS. 10–15 show an alternative embodiment of the invention. The main difference between the embodiment of FIGS. 10–15 and that of FIGS. 1–9 is in the upper part. The same reference numerals are used for corresponding parts in the two devices.

Figures 10, 11, 12:
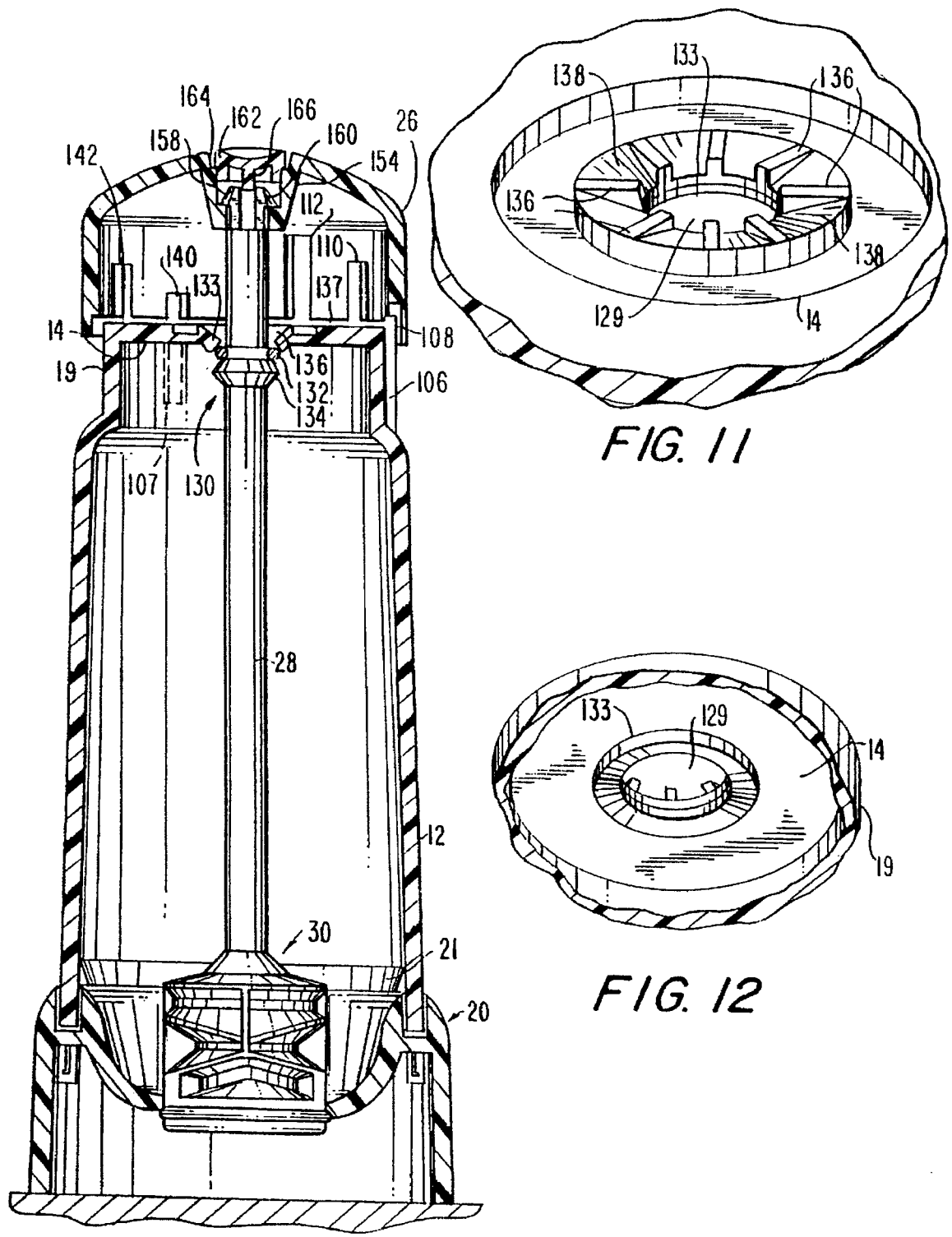
FIG. 10 is a cross-sectional view of another condiment dispenser constructed in accordance with the present invention.
FIGS. 11–15 are enlarged views of portions of the device of FIG. 10.
Figure 14:
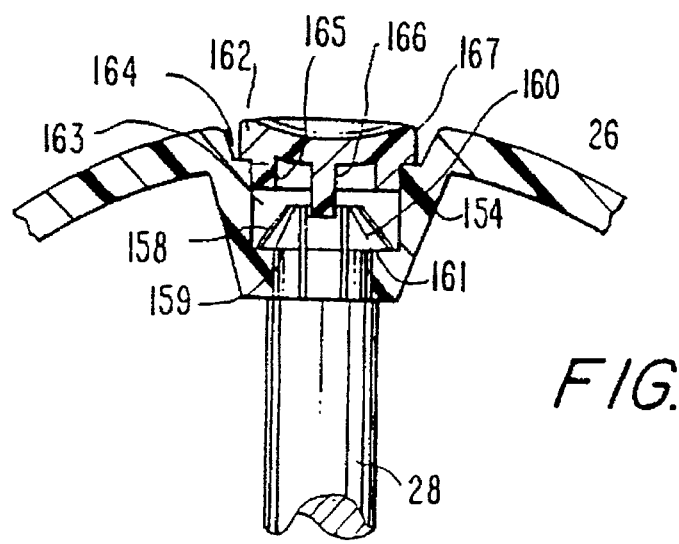
Figure 15:
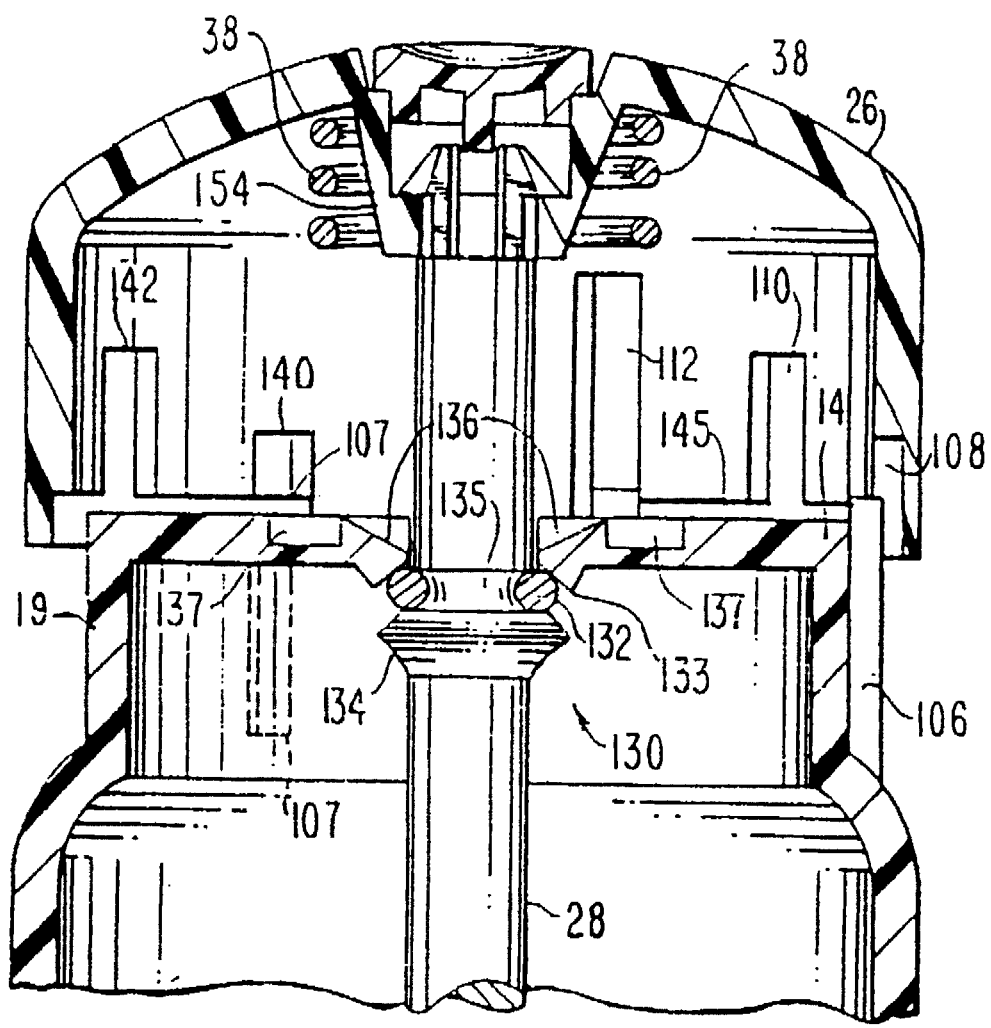

A simplified top seal structure is shown at 130 in FIGS. 10 and 15. That structure includes a sloping flange 134 extending from the stem 28 and a flexible "O"-ring seal 132 seated in a groove 135 in the stem 28 (see FIG. 14). The opening 129 (FIG. 11) in the top wall 14 through which the stem 28 passes has a cross-sectional shape, as shown in FIG. 15, in which the upper and lower surfaces diverge, as shown at 133 in FIGS. 12 and 15. This forms a concave seat for the "O"-ring 132 to ensure that it forms a tight seal with the stem when it is compressed. The top surface of the flange 134 slopes downwardly to allow condiment grains to fall down into the housing.

A shaft retainer structure above the opening 129 is shown in FIG. 11. A bearing surface for the stem 28 is formed by a plurality of radial ridges 136 with rounded edges. Downwardly sloping surfaces 138 are provided between the ridges. The stem 28 bears against the inner most edges of the ridges 136. The sloping surfaces 138 tend to guide any stray grains of salt or other condiments back into the housing, under the force of gravity, if they should escape from the housing into the area under the cap 26.

This structure also minimizes the thickness of the wall 14 which contacts the stem 28, thus further reducing the chances of grains of condiment becoming caught in the area and jamming the mechanism.

The innermost ends of the ridges bear against the stem 38 to stabilize it and support it, but do not materially increase the chances of jamming.

As it is shown in FIG. 10, the thickness of the wall of the housing 12 increases gradually from the top to the bottom of the housing to a point 21 at which it suddenly decreases to form a ledge overhanging the top edge of the base 2. This seals the crevice between the housing wall and the base to prevent condiment from entering it.

CAP STRUCTURE

Figure 13:
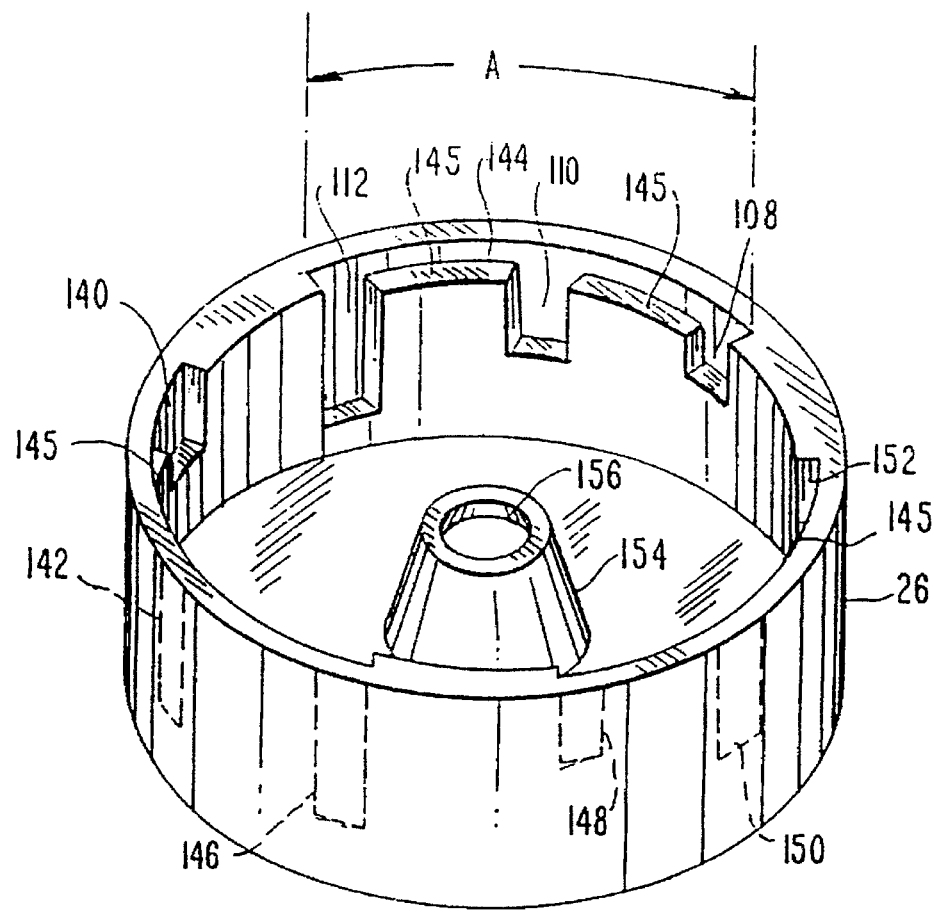

The cap 26 is shown in FIGS. 13–15, as well as in FIG. 10. In addition to the three grooves 108, 110 and 112, there are six other grooves, 140, 142, 146, 148, 150 and 152, arranged in two groups, each arranged symmetrically with respect to the first group of grooves 108, 110 and 112. There also are two stop members in addition to the stop 106. Only one of the added stops, number 107, is shown in FIGS. 10 and 15. Those stops are positioned 120° from one another and from the stop 106.

The stops and grooves are arranged so that when the cap is positioned to select the smallest quantity to dispense, the stop 106 enters the shortest groove 108, and the other two stops enter the other two short grooves 140 and 148 of the same length.

When the cap 26 is rotated to selected the next greatest quantity, each stop enters one of the grooves of the intermediate length 110, 142 or 150.

Finally, when the cap is rotated to select the greatest quantity, each of the longest grooves 112, 146 and 152 is positioned so that one of the stops enters it. The longest grooves also are of equal length.

By providing three symmetrically spaced stops, there always will be at least one, and usually more, stops underneath the spot at which pressure is applied, even when the cap 26 is depressed by applying pressure at a spot other than the center of the cap. This prevents placing excessive bending pressure on the joint between the cap and the end of the stem and thus avoids premature failure of that joint or other parts of the dispenser structure which might occur if only a single stop were used.

As is shown in FIG. 13, the lower edge of the cap is cut away at three places on the inside edge as shown at 144. Each cut 144 spans the arc "A" encompassing one of the groups of three grooves. This forms end stops against which the upper end of one of the stops 106, 107, etc., abuts to prevent rotation of the cap for a greater distance then the length of the arc "A".

The detent function of the FIGS. 1–9 embodiment is provided by each of the stops 106, 107, etc. which, as it can be seen in FIGS. 10 and 15, extends upwardly slightly above the surface 145 formed by the cut 144. Thus, when the cap is rotated, the surfaces 145 ride up onto the tops of the stops. When the next grooves reach the stops, the cap drops down slightly as the stops snap into the grooves. This locates the stops accurately, and informs the user that the cap is properly aligned.

LOCK-SEAL STRUCTURE

In accordance with another feature of the invention, the stem 28 can be locked to prevent unwanted motion, and to hold the upper seal 132 tightly shut. This prepares the dispenser for being transported, perhaps upside-down, or filled, again upside-down, or washed out with water.

When the cap is turned and the surfaces 145 (FIG. 13) ride up on the tops of the stops, this lifts the stem 28 vertically, forces the flange 134 (FIG. 10) against the "O"-ring 132, and tightly seals the opening around the stem 28. This seal prevents condiment grains from passing through the opening 129 (FIG. 11) and getting into the area under the cap 26, even while the container is turned upside-down and shaken during filling or transportation. The distance of movement of the stem is only about 10 to 15 thousandths of an inch (0.25 to 0.38 mm), but this is enough to compress the "O"-ring 132 and form a tight seal.

In fact, the seal is tight enough to resist or stop the flow of water through the opening 129. Therefore, if the bottom is removed, the interior can be washed with water without leakage into the area under the cap.

If the dispenser is used with the bottom 20 in place, the locking action will tend to tighten the seal provided by the "O"-ring 68 between the dispensing head 30 and the outlet opening. Therefore, the dispenser is less likely to leak its contents during transportation.

The tightening of seals provided by the locking feature also helps protect against the adverse effects of moisture in the ambient air.

ROTATABLE CAP ATTACHMENT

The cap 26 is rotatably attached to the upper end of the stem 28, as it is shown most clearly in FIGS. 14 and 15.

The upper end of the stem 28 has an integral pair of flexible fingers 158 and 160 with ramp-shaped upper surfaces forming a lower ridge 159 or 161 which seats on a mating inside ledge in a molded cavity 163 in a frustro-conically shaped projection 154 extending downwardly from the upper wall of the cap 26.

The fingers 158, 160 are shaped with a space between them so that the cap can be attached to the stem by simply pressing the fingers 158, 160 into a hole in the bottom of the projection 154. As the fingers enter the hole, the upper ramp-shaped surfaces of the fingers are forced together. Then the fingers snap apart when they enter the cavity 163, and seat themselves on the ledge in the cavity.

A plug 162 is force-fitted into the cavity 163. The plug has a downwardly-extending cylindrical portion 165, and a round central projection 166. A flange 167 is formed at the outer edge.

When the plug is fitted into the cavity 163, the flange 167 rests on a ledge 164. The projection 166 holds the fingers 158, 160 apart to prevent the cap 26 from coming off of the stem, and allows the cap to be rotated without moving the stem. This prevents the stem from rotating when the cap is rotated to select a quantity to be dispensed, and thus prevents leakage of salt or other condiments past the "O"-ring seals 68 or 132 which might be caused if the stem were rotated with the cap.

As it is shown in FIG. 15, the spring 38 has a diameter slightly larger than the largest diameter of the frustro-conical projection 154. This facilitates attachment of the cap to the stem because the projection 154 fits easily into the top end of the spring coil, but yet the top of the spring coil seats securely at the junction of the projection 154 and the upper wall of the cap.

Figure 16:
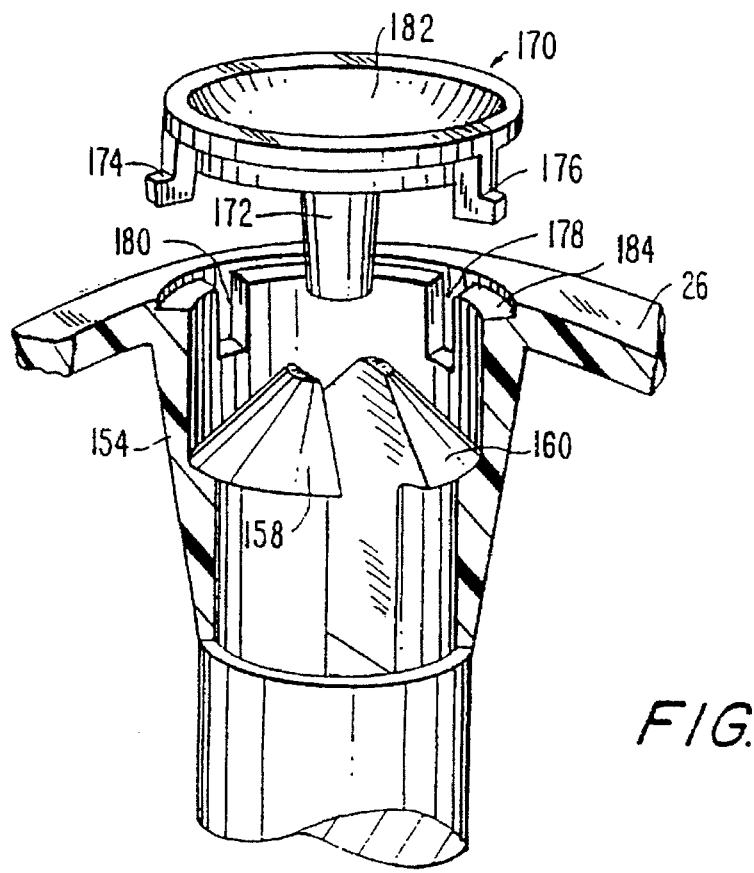
FIGS. 16–17 are enlarged views of portions of the FIG. 10 device showing another embodiment of the invention.
Figure 17:
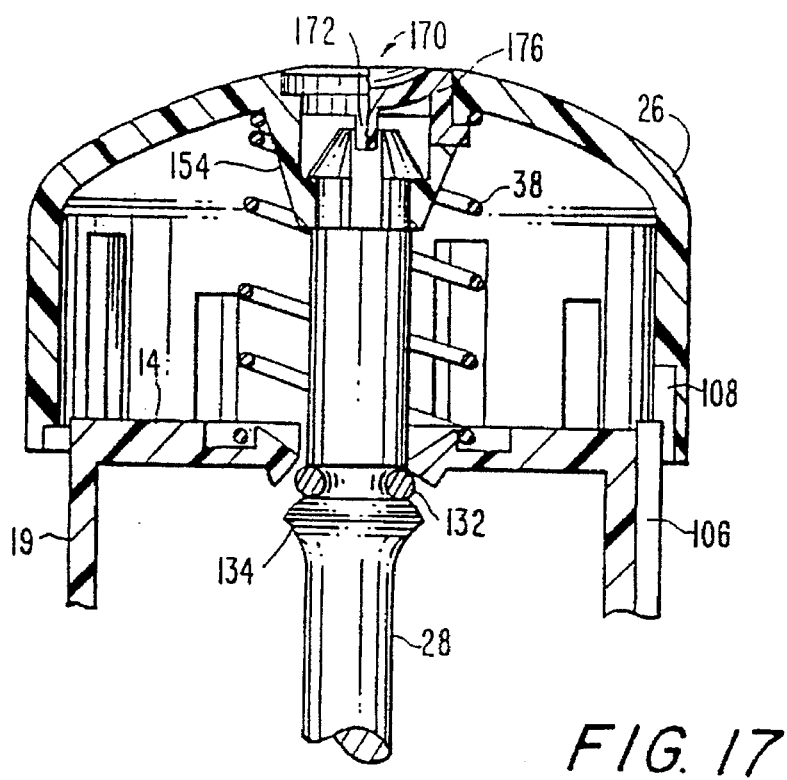

FIGS. 16 and 17 show an alternative top plug 170. This plug, like the one shown in FIG. 14, has a round central projection 172 which fits between the fingers 158 and 160.

The plug 170 is held in place by three flexible L-shaped lugs 174, 176 (only two are shown) located symmetrically around the edge of the plug body. These lugs snap into holes 178, 180, etc., in the wall of the projection to hold the plug in place very securely.

The top of the plug is dished-out at 182. The plug fits into a recess at 184 to make the edge of the plug flush with the top of the cap 26.

PREFERRED DISPENSING HEAD SEAL

Figure 18:
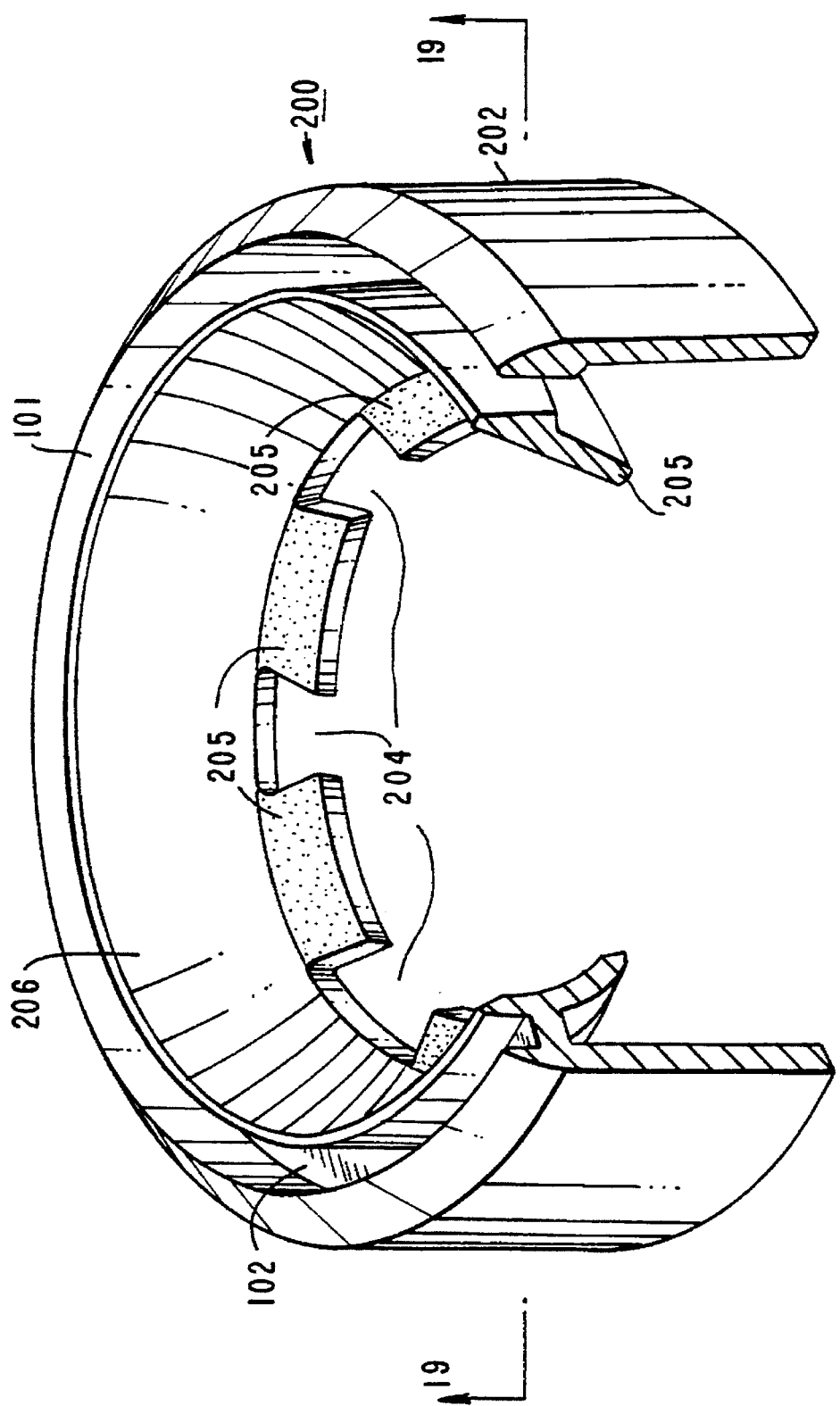
FIG. 18 is a perspective, broken away view of the base of an alternative embodiment of the invention.
Figure 19:
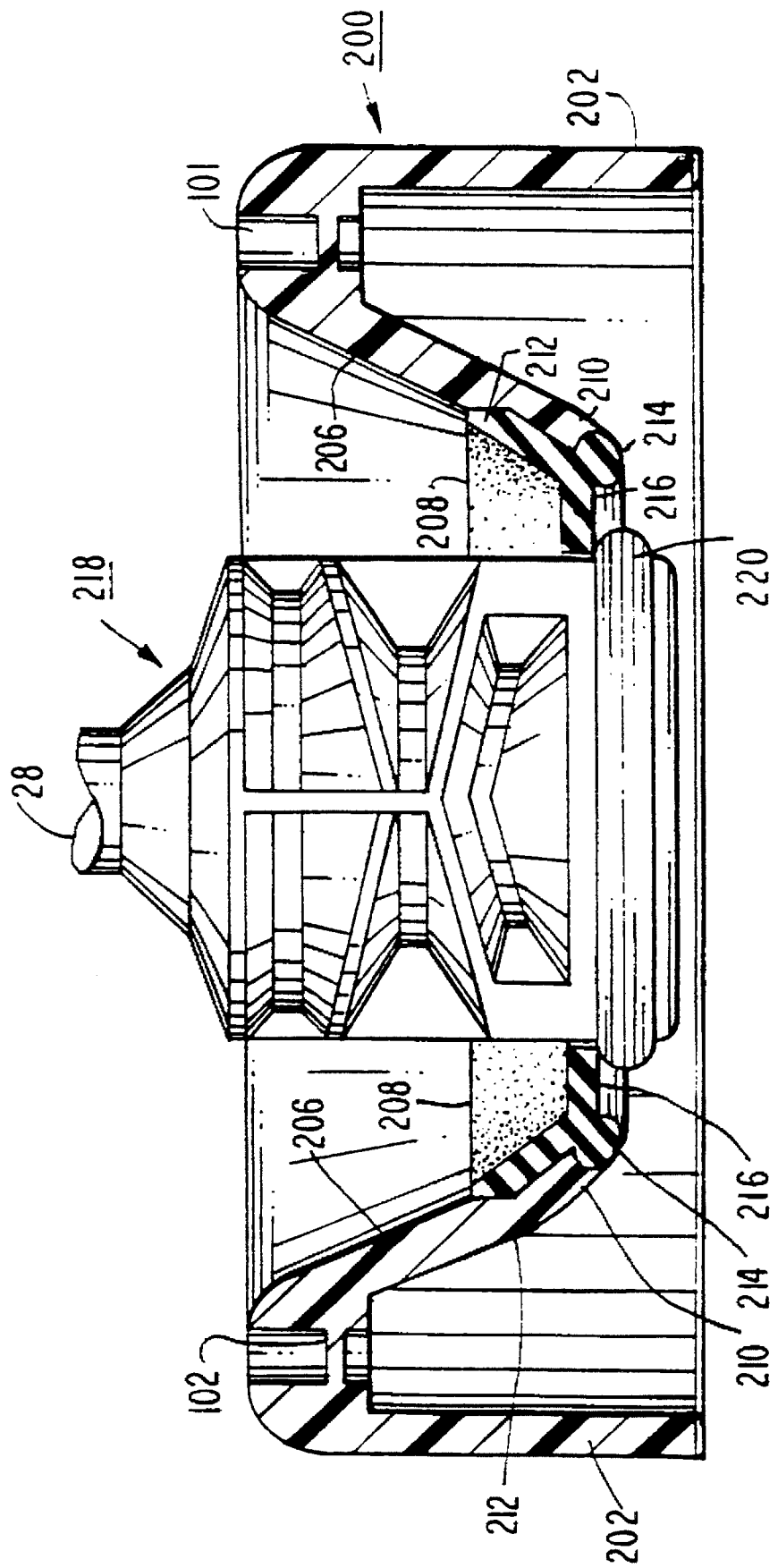
FIG. 19 is a cross-sectional, broken-away view of the preferred dispensing head and seal structure used with the base shown in FIG. 18.

FIGS. 18 and 19 show the preferred base 200, dispensing head 218 and seal structure 208 of the invention. The remaining structure of the container is the same as that described above.

The dispensing head 218 is the same as the dispensing head shown and described above, except that a ring 220, molded as part of the head, extends outwardly from the body of the dispensing head near its bottom.

The removable base structure 200 shown in FIGS. 18 and 19 include a side wall 202, and a frustro-conical internal wall 206 which forms the bottom wall of the dispensing container. The outlet opening in the bottom wall is considerably larger than it is in the embodiments described above.

As it is shown in FIG. 18, the lower edge of the wall 206 has a series of spaced dovetail notches 204 forming spaced projections 205. The surfaces of the projections 205 are etched or roughened by other means so as to form a surface which can be readily gripped by the material of the seal structure 208.

The sealing member 208 is molded around the edge of the opening in the bottom wall. The sealing member is made of a flexible plastic material such as urethane rubber, e.g., that sold under the trademark "Santoprene". It includes a base portion 214, a substantially horizontal flexible extension forming a flap 216, and a frustro-conical flange 212.

Preferably, the seal structure 208 is formed by molding it in place, either after or during the process of molding the base 200. The urethane rubber is injected into a mold at a temperature of several hundred degrees fahrenheit and a pressure of about 12,000 p.s.i. This is believed to create some co-valent bonding between the methane rubber and the polypropylene base material to create a good bond between the seal and the base. The bond is greatly strengthened by the flow of the seal material into the slots 204. The dovetail shape of the slots helps hold the seal in place. The roughened surfaces of the projections 205 also help.

As it can be seen in FIG. 19, the opening in the seal structure 208 is slightly larger than the diameter of the upper portion of the dispensing head 218 so that intimate contact is not made between the dispensing head and the seal structure as the dispensing head is moving downwardly through the opening in the seal structure.

When the dispensing head is at rest, as shown in FIG. 19, the ring 220 at the bottom of the dispensing head makes firm contact with the bottom of the flap 216 to hermetically seal the outlet opening of the dispenser.

As the dispensing head 218 moves downwardly through the opening in the seal, any grains of granular condiments such as salt which might get caught between the seal and the dispensing head do not cause the dispensing head to jam because the flexibility of the flap 216 allows it to be elastically deformed by the grains so that they pass through relatively easily. The base 214 helps to prevent this action from dislodging the seal from the outlet opening because it bears against the edges of the projections 205.

When it is desired to remove the base 200 from the rest of the container for refilling, the flexible flap 216 easily allows the protruding ring 220 to pass through the sealing structure.

The frustro-conical flange 212 is formed with the same angular shape as the bottom wall 210, and hugs it tightly. This flange helps to prevent the seal from becoming unseated when the dispensing head 218 is pulled upwardly against it when the dispensing head is at rest, or when the dispensing head is pulled through the seal structure to remove the base 200 for refilling.

In a dispenser which has been made and successfully tested, the material of the seal structure 208 is "Santoprene" urethane rubber with a hardness of approximately 70 durometer. The material of the flap 216 is approximately 0.05 inch thick, and the maximum radial width of the flap 216 is approximately 1/8th inch.

The seal structure shown in FIG. 19 allows the plunger or stem 28 of the dispenser to be depressed smoothly and easily, without jamming. It also facilitates the rotation of the dispensing head when the cap of the dispenser is rotated to select a different quantity to be dispensed.

MATERIALS

Following are materials which preferably are used in making the various components of the dispenser device shown in the drawings.

The cap 26, the stem 28, the plug in the top of the cap, and the base 20 all are preferably made of opaque ABS thermoplastic resin. Each part is molded. The stem, flanges 44 and 48 (FIG. 1), and the dispensing head 30 preferably are molded as a single unit. The flange 134 and the fingers 158, 160 of the second embodiment also are molded together with the stem and the head 30.

Preferably, the side wall 18 and top wall 14 of the cylinder 42 are a single molded part made of a polycarbonate resin, such as "Lexan" brand resin. Such a material is transparent so that the contents of the dispenser can be seen by the user, and is highly resistant to breakage.

The sealing washers 51 and 53 preferably are made of high density polyethylene or polypropylene with a flex modulus which makes it very flexible so that it can form a tight seal with an interference fit with the interior of the cylinder 42.

The spring 38 preferably is made of stainless or plated spring steel to protect it against corrosion.

The "O"-rings 68 and 132 preferably are made of neoprene rubber.

The shape of the bottom wall 16 preferably is selected so that the top of the base 20 is approximately aligned with the top of the dispensing head 30 so that the user can easily observe when the quantity of material in the dispenser is getting low.

As it can be seen from the foregoing, the dispenser 10 described above amply meets the objectives set forth above. The dispenser can be easily set to one of a plurality of different settings to dispense a selected quantity of condiment. The device has several features which prevent or minimize the chances of jamming, and the device has hermetic seals which amply protect the contents of the container from the adverse affects of moisture. The device can be locked to prevent unwanted dispensing, and to facilitate washing, filling and transportation.

The device can be made of just a few molded parts and seals. It is of relatively simple and inexpensive construction, and yet is highly reliable and easy to use.

The device is a substantial boon to users with salt-restricted or other restricted diets, because they can quickly and easily dispense measured amounts of the condiments, either at the table or while cooking, to maintain their diet and thus maintain good health.

This invention can be practiced in many different forms other than the specific forms described above. These specific forms are described in order to set forth the best mode presently contemplated for carrying out the invention. However, the protection of this patent should not be limited to those forms and should be interpreted to cover other measuring containers utilizing the spirit and inventive contribution of this invention.

We claim:

1. A condiment dispenser, said dispenser comprising, in combination, a container having a first wall with an opening, a side wall and a second wall opposite said first wall, said second wall having an opening in it, a plunger having first and second ends, said first end extending through said opening in said first wall, said plunger having a measuring member at said second end, said measuring member having at least one recess for containing and dispensing a pre-measured quantity of condiment when said plunger is pressed to move said measuring member from a position inside said container through said opening in said second wall, and a flexible sealing member forming a seal between said second wall and said measuring member, said sealing member having a body and an elongated flexible extension from said body extending at an acute angle with respect to said measuring member and contacting said measuring member.

2. A dispenser as in claim 1 in which said dispenser has a spring for urging said plunger to a rest position in which said recess of said measuring member is inside of said container, said measuring member having a projecting ledge contacting said extension when said plunger is in said rest position to seal said opening in said second wall.

3. A dispenser as in claim 1 including a second resilient sealing member at said opening in said first wall for sealing the junction between said plunger and said first wall.

4. A condiment dispenser, said dispenser comprising, in combination, a container having a first wall with an opening, a side wall and a second wall opposite said first wall, said second wall having an opening in it, a plunger having first and second ends, said first end extending through said opening in said first wall, said plunger having a measuring member at said second end, said measuring member having at least one recess for containing and dispensing a pre-measured quantity of condiment when said plunger is pressed to move said measuring member from a position inside said container through said opening in said second wall, and a flexible sealing member forming a seal between said second wall and said measuring member, said sealing member having a body and an elongated flexible extension from said body making contact between said second wall and said measuring member, in which said second wall has a plurality of notches, and said sealing member is shaped to fit into said notches to secure said sealing member to said second wall.

5. A dispenser as in claim 4 in which said sealing member is molded in place to fill said notches.

6. A condiment dispenser, said dispenser comprising, in combination, a container having a first wall with an opening, a side wall and a second wall opposite said first wall, said second wall having an opening in it, a plunger having first and second ends, said first end extending through said opening in said first wall, said plunger having a measuring member at said second end, said measuring member having at least one recess for containing and dispensing a pre-measured quantity of condiment when said plunger is pressed to move said measuring member from a position inside said container through said opening in said second wall, and a flexible sealing member forming a seal between said second wall and said measuring member, said sealing member having a body and an elongated flexible extension from said body making the contact between said second wall and said measuring member, in which said second wall has a portion which forms an acute angle with respect to the surface of said measuring member, and said body of said sealing member has a second extension extending outwardly at said acute angle and contacting said portion of said second wall.

7. A condiment dispenser, said dispenser comprising, in combination, a container having a first wall with an opening, a side wall and a second wall opposite said first wall, said second wall having an opening in it, a plunger having first and second ends, said first end extending through said opening in said first wall, said plunger having a measuring member at said second end, said measuring member having at least one recess for containing and dispensing a pre-measured quantity of condiment when said plunger is pressed to move said measuring member from a position inside said container through said opening in said second wall, and a flexible sealing member forming a seal between said second wall and said measuring member, said sealing member having a body and an elongated flexible extension from said body making contact between said second wall and said measuring member, in which said dispenser has a spring for urging said plunger to a rest position in which said recess of said measuring member is inside of said container, said measuring member having a projecting ledge contacting said extension when said plunger is in said rest position to seal said opening in said second wall, and in which said second wall is formed in a closure member for said container, and including releasable securing means for securing said closure member to said side wall to permit said closure member to be removed and replaced for filling said container, said flexible extension being capable of flexing to allow said ledge to move past said sealing member during the removal or replacement of said closure member.

8. A condiment dispenser, said dispenser comprising, in combination, a container having a first wall with an opening, a side wall and a second wall opposite said first wall, said second wall having an opening in it, a plunger having first and second ends, said first end extending through said opening in said first wall, said plunger having a measuring member at said second end, said measuring member having at least one recess for containing and dispensing a pre-measured quantity of condiment when said plunger is pressed to move said measuring member from a position inside said container through said opening in said second wall, and a flexible sealing member forming a seal between said second wall and said measuring member, said sealing member having a body and an elongated flexible extension from said body making contact between said second wall and said measuring member, in which said measuring member has a plurality of cavities of different sizes spaced apart longitudinally with respect to said plunger, and a variable stop structure for stopping the movement of said plunger at a selected one of a plurality of stop positions to adjust the quantity of condiment dispensed with each actuation of said plunger.

9. A condiment dispenser comprising a container having a plurality of walls including a removable bottom wall with an outlet opening in it, a measuring member mounted in said container, said measuring member having at least one measuring cavity and being mounted in said container so as to be movable between a first position in which said cavity is inside of said container and a second position in which said cavity has passed through said outlet opening by a distance sufficient for the contents of said cavity to be discharged, an actuating member accessible from the outside of said container and operable to move said measuring member to said second position, a sealing member adjacent said outlet opening and forming a flexible flap for contacting said measuring member and sealing said outlet opening when said measuring member is in said first position, said sealing member being secured to said removable bottom wall to permit said bottom wall and sealing member to be removed and replaced to refill said container.

10. A dispenser as in claim 9 in which said measuring member has a generally cylindrical shape with an enlarged lower portion for contacting said flexible flap when said measuring member is in said first position, and said flap forms a generally circular opening slightly larger in diameter than the measuring member above said lower portion.

11. A dispenser as in claim 10 in which said bottom wall has a plurality of dovetail notches and said sealing member is formed by molding it in place so that its material fills said notches, and the material of said bottom wall covered by said seal is roughened.

12. A dispenser as in claim 9 in which said bottom wall has a generally frustro-conical shape, and said sealing member has a frustro-conical flange engaging the inside of said bottom wall.

* * * * *